United States Patent
Ozer et al.

(10) Patent No.: US 6,704,929 B1
(45) Date of Patent: Mar. 9, 2004

(54) TRACKING VIEWING BEHAVIOR OF A HOME ENTERTAINMENT SYSTEM

(75) Inventors: Stuart Ozer, San Francisco, CA (US); Timothy F. Park, Menlo Park, CA (US); Daniel J. Zigmond, Carnation, WA (US); Michael A. Killianey, San Mateo, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/376,632

(22) Filed: Aug. 18, 1999

(51) Int. Cl.[7] .............................. H04H 9/00; H04N 7/16
(52) U.S. Cl. .............................. 725/13; 725/16; 725/39; 725/132
(58) Field of Search ................................ 725/20, 14, 39, 725/109, 110, 132, 134, 46, 34, 16, 13

(56) References Cited

U.S. PATENT DOCUMENTS

| | | | | |
|---|---|---|---|---|
| 4,943,963 A | * | 7/1990 | Waechter et al. ............ 725/132 |
| 5,305,464 A | | 4/1994 | Frett .............................. 455/2 |
| 5,481,294 A | * | 1/1996 | Thomas et al. ................ 725/20 |
| 5,600,378 A | | 2/1997 | Wasilewski ................... 725/39 |
| 5,758,259 A | * | 5/1998 | Lawler ......................... 725/45 |
| 5,819,156 A | * | 10/1998 | Belmont ....................... 725/14 |
| 5,857,190 A | * | 1/1999 | Brown .......................... 725/14 |
| 5,872,588 A | * | 2/1999 | Aras et al. .................... 725/110 |
| 6,002,394 A | * | 12/1999 | Schein et al. .................. 725/39 |
| 6,177,931 B1 | * | 1/2001 | Alexander et al. ............. 725/52 |
| 6,202,210 B1 | * | 3/2001 | Ludtke ......................... 725/16 |
| 6,308,328 B1 | * | 10/2001 | Bowcutt et al. ............. 725/110 |
| 6,405,370 B1 | * | 6/2002 | Jarrell .......................... 725/14 |
| 6,457,010 B1 | * | 9/2002 | Eldering et al. ............... 725/14 |

* cited by examiner

*Primary Examiner*—John Miller
*Assistant Examiner*—Scott Beliveau
(74) *Attorney, Agent, or Firm*—Workman Nydegger

(57) ABSTRACT

Systems and methods for providing and tracking viewing behavior of home entertainment systems. A viewer event such as tuning to a selected television channel, occurs at a home entertainment system. The event is coupled with information describing the programming viewed on the home entertainment system and is stored locally. The information describing the programming is obtained from an electronic program guide. Subsequent viewer events are also coupled with information describing the programming viewed and stored locally. The resulting viewing behavior that is stored locally is transmitted to a remote clearinghouse for storage. The remote site receives a great diversity specific information from a plurality of home entertainment systems, which represents and describes, in any desired degree of specificity, the programming that the public is viewing, the origin of the programming, and the way in which the programming is being viewed.

26 Claims, 6 Drawing Sheets

TRACKING VIEWING BEHAVIOR OF A HOME ENTERTAINMENT SYSTEM

BACKGROUND OF THE INVENTION

1. The Field of the Invention

The present invention relates to a system and method for tracking viewing behavior of a home entertainment system. More specifically, the present invention is directed to a method for tracking viewing behavior by monitoring input by a user of a home entertainment system coupled with the use of a tuning device and information obtained from an electronic program guide to generate a wide variety of specific viewing behavior information.

2. The Prior State of the Art

Historically, television has been a source of entertainment for the general public and a medium through which an enormous number of individuals can be reached. Businesses recognize the value of this medium and take advantage of it by annually investing billions of dollars into the purchase of airtime for television programs and commercials.

Because the financial investment into television is so enormous, specific information as to what the public is viewing on television is a valuable commodity. The knowledge of information such as the audience share of television programs allows for the development of marketing and advertising schemes, program schedules, price rates for airtime, retention or termination of television programs, and the creation of new programs desired by the public.

The methods that have been employed to gather information on viewer behavior have been extremely limited as to the amount and type of information that is gathered. By way of example, members of the viewing public can be paid to record in logbooks the television channels they watch during a sample period of time and then mail the logbooks to a central location after the completion of the sample period. At the central location, the channels watched and recorded in the logbooks are manually entered into a database and processed centrally to obtain usable data.

The volume of information that can be obtained according to this technique is inherently limited because viewers are generally not willing to invest large portions of time to register an abundance of information in logbooks. Further, a viewer's desire to quickly complete the registering of information and the existence of mistakes in the registering process introduces human error into the data sample. The manual nature of this approach coupled with the non-electronic form of the data make it inefficient for use with automated and computer-based forms of data processing. In addition, it is particularly difficult or impossible to gather viewing behavior other than a list of viewing times, channels, and programs.

Another method involves installing devices in the homes of viewers to monitor and record the channels tuned during a sample period. Each viewer of a household is assigned a symbol recognizable to the device and is responsible to select that symbol to indicate that he or she is watching the television. From time to time the device flashes a red light to remind the viewers to select their corresponding symbol. The viewing information, including the channels and the viewing date and time recorded by the devices, is transmitted to a central location. The viewing information is converted into a usable form at the central location by, for example, converting data that identifies the channel to data representing the corresponding television program.

Since the conversion process is performed at the central location inaccuracies result when circumstances take place prior to the performance of the conversion process. Examples of such circumstances include last minute changes in the program schedule, different cable companies placing network stations in different places in the channel lineup, programs that are aired at different times in different locations, and viewers receiving a signal that is broadcast from a different time zone. Moreover, this conversion process can involve a significant amount of data processing, because the television programming that is broadcast on a given channel at a specified time can vary from locality to locality. Furthermore, this method relies on a broadcaster encoding each program for detection by the device and is therefore inappropriate for tracking less popular, locally produced, or exclusively cable-based programming. Therefore, this method is also undesirably limited in the amount and type of viewing information that is obtained.

It would, therefore, be an advancement in the art to generate a greater variety of very specific television programming viewing behavior information. It would also be desirable if such information could provide a more accurate measurement of viewing behavior. Such information would be particularly useful if it could be readily adapted to a variety of television programming, such as local programming, network programming, cable programming, or satellite programming. It would be a further advancement in the art to obtain information relating to the use of interactive television features by a viewer while watching television programming. It would also be an advancement in the art to reduce the amount of data computation required at a central location to generate usable viewing information. Furthermore, it would be desirable to track and measure channel surfing or other similar viewer behavior.

SUMMARY OF THE INVENTION

The present invention is directed to a system and method for tracking viewer behavior in a home entertainment system and overcomes the above-mentioned difficulties by being fully automated and providing a greater diversity of specific information regarding viewer behavior of home entertainment systems. The invention recognizes an event initiated by a viewer, couples that event with information obtained from an electronic program guide, and transports the information to a remote site on a periodic basis.

Implementation of the present invention may take place in application specific set-top boxes, cable or satellite boxes, Internet set-top boxes, television sets, personal computers, or any other device that is included in a home entertainment system, has access to an electronic program guide, and has data storage and processing capabilities to perform the operations disclosed herein.

According to one implementation of the invention, the process of tracking viewer behavior is initiated by the occurrence of an event performed by a viewer. The event could include, for example, the powering on of the home entertainment system and tuning to a selected channel. The event is then coupled with specific information that is associated with the programming displayed on the home entertainment system. This information is retrieved, for instance, from an electronic program guide, and can include, by way of example, the title of the program, the episode, the director, the performing actors, the program ratings or any other desired information associated with the program. The information can also include information specific to the channel, such as the channel number, the call letters of the station, the network affiliation, the transmission frequency, and the origin of transmission. The information can also include other specific information, such as data identifying a local station, a network station, a cable station, a satellite station, the location of the subscriber, the date subscribed, a package identification, and a status type.

Another implementation of the invention tracks events that are not initiated by the viewer, but are essential in obtaining a correct measurement of a program's audience and/or viewer behavior. In particular, a clock synchronized with an electronic program guide can detect when a new program has begun on a channel being viewed. The initiation of a new program on the channel being viewed is an event, triggered automatically by the passing of time, and indicates that the viewer is watching a new program on the tuned channel.

As subsequent events occur, those events are also tracked. Events that would be subsequent to the initial event of powering on the system and tuning to a channel include such user initiated events as tuning to another channel, causing closed captioning to be displayed, initiating the mute function, simultaneously watching multiple programming and simultaneously viewing television programming while using the Internet. Subsequent events also include events that are not initiated by a viewer, such as the ending of one program and beginning of another program on the same channel. Each of the subsequent events is coupled with descriptive information from the electronic program guide.

The date and time that the events are performed can also be monitored and recorded. An electronic device in which the methods of the invention are implemented can be preprogrammed with the current time, date, time zone, week number, and day of the week. Accordingly, detailed viewing behavior, such as the viewing start time, the viewing stop time, the minutes watched, whether the viewing was channel surfing, and the like, can be monitored and recorded in response to viewer input and events performed by the viewer.

The viewing behavior information that has been tracked is stored locally and is periodically transmitted to a remote site. In one embodiment, only the viewing behavior and identifying codes for programs, channels and viewers are required for storage and transmission. In such an embodiment, the viewing behavior and identifying codes can be combined at the remote site with descriptive information about the programming and demographic information about the viewer. This process of tracking, storing, and transmitting viewing behavior information can be performed in home entertainment systems at any number of locations. The viewing behavior information is received from these locations at one or more central sites or clearinghouses, where it can be further processed and made available to any interested entities.

The present invention provides for a more accurate measurement and a greater variety of viewing behavior information. The measurement is no longer limited to the channel number tuned. Moreover, because specific information from an electronic program guide is used at the home entertainment system to compile viewing behavior information, this information is sent to the central clearinghouse in a usable form that is descriptive of the programming displayed to the viewer, rather than merely including only a channel number and a time. By compiling the viewer behavior information locally, the amount of processing required at the central clearinghouse is significantly reduced when compared to conventional techniques. Furthermore, when last minute changes take place in the program schedule, when different cable companies place network stations in different locations in the channel lineup, when programs are aired at different times in different locations, or when viewers receive a signal that is broadcast from a different time zone, inaccuracies do not occur because the processing takes place locally at the home entertainment system.

Additional objects and advantages of the invention will be set forth in the detailed description that follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
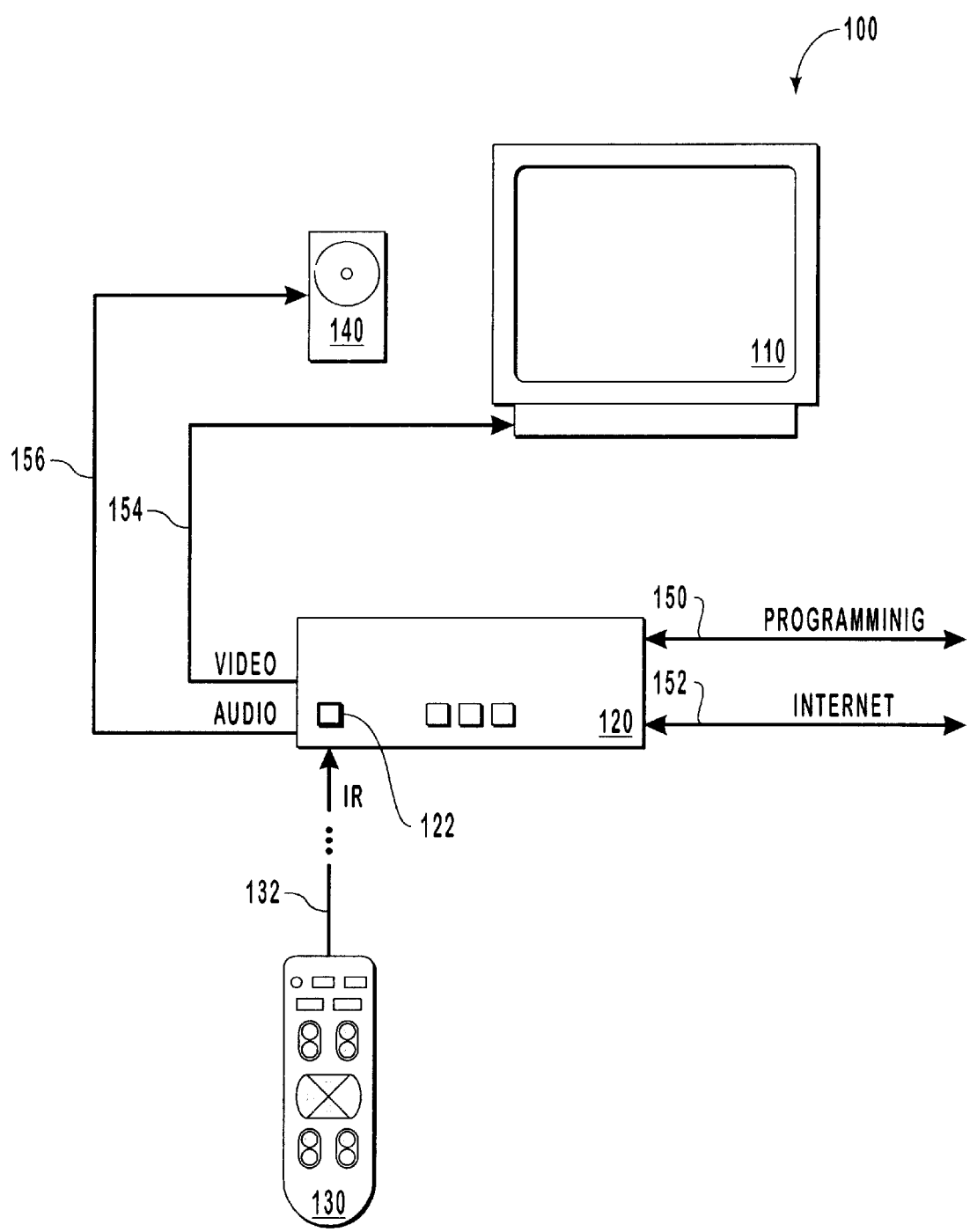
FIG. 1 is a schematic drawing of a suitable operating environment for the present invention.

The present invention extends to both methods and systems for tracking viewer behavior in a home entertainment system. In accordance with the present invention, a great diversity of specific information regarding viewer behavior of home entertainment systems is automatically obtained. The information is obtained through an event initiated by a viewer coupled with information from an electronic program guide and periodically transported to a remote site.

The invention is described below by using diagrams to illustrate either the structure or processing of embodiments used to implement the systems and methods for tracking viewer behavior in a home entertainment system. Using the diagrams in this manner to describe the present the invention should not be construed as limiting its scope.

The embodiments of the present invention may comprise a special purpose or general purpose computer including various computer hardware, as discussed in greater detail below. The embodiments may further comprise multiple computers linked in a network environment. Embodiments within the scope of the present invention also include computer-readable media having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

In one embodiment, the invention is implemented in a system known as a WebTV® set-top box, developed by WebTV Networks, Inc. of Mountain View, Calif., having been adapted to perform the operations disclosed herein. A WebTV® set-top box uses a conventional television screen or other display unit to display information and includes a networked computer for composing, sending and receiving e-mail, browsing the World Wide Web (Web), accessing other segments of the Internet, and otherwise displaying information. A WebTV® set-top box uses standard telephone lines, Integrated Services Digital Network (ISDN) lines, cable lines associated with cable television service, or the like to connect to the Internet or other wide area networks.

FIG. 1, along with the corresponding discussion, is intended to provide a general description of a suitable environment in which the invention may be implemented. FIG. 1 specifically illustrates a basic home entertainment system. Such a home entertainment system generally includes a display device to which other devices may be connected. The connected devices might include, for example, a video cassette recorder (VCR), a video game system, a sterco system, cable television, a cable box, DSS/DVB, DVD, a set-top box that serves as an Internet terminal, or any other apparatus or combination that is capable of receiving a signal.

Therefore, for purposes of this description and in the claims, a "home entertainment system" may simply be a television set coupled with a processing device for performing the data processing steps disclosed herein, or can be as complex as desired, with any number of consumer electronic devices being attached to a display device, one of which having a processing device for performing the data processing steps disclosed herein. Moreover, "home entertainment system" is to be understood as a term that broadly describes a television viewing environment, whether it is located in a viewer's home, at a place of business, in the public, or at any other location. While the invention can be advantageously implemented in the environment illustrated in FIG. 1, it can also be practiced in any number of other systems that will be understood by those skilled in the art upon learning of this disclosure, such as in combination with a VCR, a video game system, a stereo system, a television with data processing capabilities, a cable television box, DSS/DVB, DVD, a set-top box that serves as an Internet terminal, and/or any other device capable of processing date as described herein.

In one embodiment, as shown in FIG. 1, home entertainment system 100 includes display device 110 and speaker device 140. Display device 110 could be a high definition television display, a standard television display, a flat panel display, a projection device, a high definition television display, a computer monitor, or any other device capable of displaying viewable video image data. Speaker device 140 could be a speaker, a stereo system, or any device capable of emitting video sound data. Speaker device 140 could be integrally positioned with respect to display device 110. For example, display device 110 may be a television monitor, and speaker device 140 may be a television speaker integrated with the television monitor.

Home entertainment system 100 further includes a means for receiving programming. In this description and in the claims, "programming" includes both the viewable portions of the moving image data (herein, "viewable video image data") and its associated sound data (herein, "video sound data"). By way of example, FIG. 1 depicts the transmission of programming to home entertainment system 100 via programming input line 150. Programming input line 150 could be a cable, an antenna system device, a satellite system device, or any device or system capable of transmitting programming to home entertainment system 100. Home entertainment system 100 may further include a means for receiving Internet line 152 for bi-directional data exchange over the Internet.

The means for receiving programming input line 150 and the means for receiving Internet line 152 are shown collectively and by way of example in FIG. 1 as management device 120. Management device 120 may be a set-top box that includes a connection for programming input line 150 in order to receive programming and a connection for Internet line 152 in order to send and receive data over the Internet. Management device 120 may be integrated with display device 110. Alternatively, the management device 120 may stand separate from display device 110.

Home entertainment system 100 also includes a means for receiving instructions from a viewer. FIG. 1 depicts such means for receiving instructions from a viewer as sensor 122, which receives viewer input from input device 130. Input device 130 can be a remote control, a keyboard, a microphone, or any device capable of generating electronic instructions for control of management device 120. Input device 130 is communicatively coupled to management device 120 over input link 132 so as to enable such control. Input device 130 generates electronic instructions over input link 132 in response to preprogrammed data or in response to a viewer pressing buttons on input device 130. Input device 130 may also control Web browser software within management system 120 as when management system 120 is a WebTV® set-top box that has been adapted to perform the operations disclosed herein. For example, input device 130 may be programmed to turn on home entertainment system 100 and to tune management device 120 to a channel.

A means for providing video image data from management device 120 to display device 110 is shown by way of example as video image link 154. Video image link 154 may be any link capable of providing video image data to display device 110 such as, for example, a radio-frequency (RF)

link, an S-video link, a composite link, or any other equivalent form of video image link.

A means for providing video sound data from management device 120 to speaker device 140 is shown by way of example as video sound link 156. Video sound link 156 may be any link capable of providing video sound data to speaker device 140 such as, for example, a radio-frequency (RF) link, a wired link, or any other equivalent form of video sound link.

A method according to one embodiment of the present invention is initiated upon the occurrence of an event performed by a viewer of home entertainment system 100. In this description and in the claims, the term "event" encompasses an instructional input received by a home entertainment system, whereby the programming displayed at the home entertainment system is selected, changed, terminated, or otherwise manipulated. The input may be entered by the viewer or some other source. The term "event" also extends to other changes in programming displayed on the home entertainment system without viewer input, one example being the beginning of a scheduled television program on an already-tuned channel.

By way of example, a viewer may initiate the powering on of a home entertainment system and/or the tuning to a specific channel. Similarly the powering on of a home entertainment system may take place subject to a timer that was previously sent. Also, the programming may change upon completion of one program and the start of a subsequent scheduled program. Other examples of "events" include the request to tune to another channel, to employ a closed captioning mode, to use a picture-in-picture feature, to access the Internet while tuned to a channel, or the turning off of the power of a home entertainment system. Once the input is received, management device 120 records the event and stores its occurrence and description information in local storage. The local storage could be located in a variety of locations within home entertainment system 100. One such location could be internal to management device 120, as will be further explained below.

Once the event occurs, management device 120 couples the occurrence of the event with information specific to the programming displayed as a result of the event. One embodiment allows for the use of unique IDs from the electronic program guide to be coupled to the event, and the date and time when the event occurred. The IDs identify such information as the program viewed and the channel tuned. Thus, a processor included in management device 120 (or any other electronic device in which the invention is implemented), coupled with computer-executable instructions, represents one example of means for generating viewing information.

The data that is used to generate and compile the viewing information is made available to management device 120 through the use of an electronic program guide according to one embodiment of the invention. The electronic program guide represents one example of means for identifying data associated with programming carried by a channel that is tuned by a home entertainment system. The data that constitutes the electronic program guide can also be stored in local storage and received via Internet line 152 or from any of a number of other transport mechanisms on a periodic basis. Electronic program guides are widely commercially available, and general concepts relating thereto will be understood by those skilled in the art. The invention can be practiced with substantially any existing source of electronic program guide data. Alternatively, an electronic program guide tailored to include programming information specifically selected for use with the invention can also be employed.

Typically, the plethora of information available through electronic program guides is very diverse, yet very specific. By way of example, and not limitation, the available information may include information specific to the programming such as the title of the program, the episode, the director of the program, the performing actors, Viewer Control Chip (VCHIP) ratings, and the Motion Picture Association of America (MPAA) ratings that include content and parental guide information. The information may also include information specific to the channel, such as the channel number, the call letters of the station, the network affiliation, the transmission frequency, and the origin of transmission. The information furthermore may include other descriptive information specific to the broadcaster or subscriber, such as whether the television signal originates from a local station, a network station, a cable station, or a satellite station; the location of the subscriber; and the date subscribed. The type of information available through the electronic program guide will be further explained below.

After a viewer event is detected by management device 120, coupled to corresponding electronic program guide information, and stored in local storage, management device 120 may detect a subsequent event performed by the viewer. By way of example, and not limitation, a subsequent event may include such events as sending input information to tune to another channel, to have closed captioning appear on display device 110 during the programming, to initiate the mute function, to simultaneously watch multiple channels through the use of a picture in picture feature, or to simultaneously view television programming while using the Internet. A subsequent event also includes the changing of programming on a station. An example of such an event would be when a program on a channel begins or ends. Therefore, as each subsequent event is received by management device 120, a similar process takes place, in that the subsequent event is coupled to corresponding electronic program guide information and stored in local storage. Therefore the invention continually tracks and stores specific information for as many as each and every event performed by a viewer of home entertainment system 100.

The date and time that the events are performed can also be tracked and recorded according to one embodiment of the invention. In order to do so, management device 120 includes or has access to a clock that monitors the current time, current date, and other information, such as the relevant time zone, current week number, and current day of the week. The clock or any other timekeeping device whether implemented in hardware or software, represents one example of means for including a date and time of programming in the viewing information that is generated and compiled according to the invention. The clock or timekeeping device provides the current date and time, thereby allowing for a coupling of the event with the descriptive information of the electronic program guide and thus a determination of which program was being viewed.

As an event is received by management device 120, the event is marked with the time and date that the event occurred. By having each event marked with the time and date that the event was performed, a processor in home entertainment system 100 is able to determine the viewing start time, the viewing stop time, the start and stop time of any event, and the length of time between any two events. By way of example, the processor may reside within management device 120 as shall be further explained below. The processor, is able to further determine and store such details as the length of time that home entertainment system 100 is in use, the percentage of the day that home entertainment system 100 is in use, the length of time that each programming was viewed, the percentage of any specific programming viewed, the portion of the programming not viewed, the frequency to which events occurred, and the amount of viewing that would be classified as "channel surfing".

Figure 2:
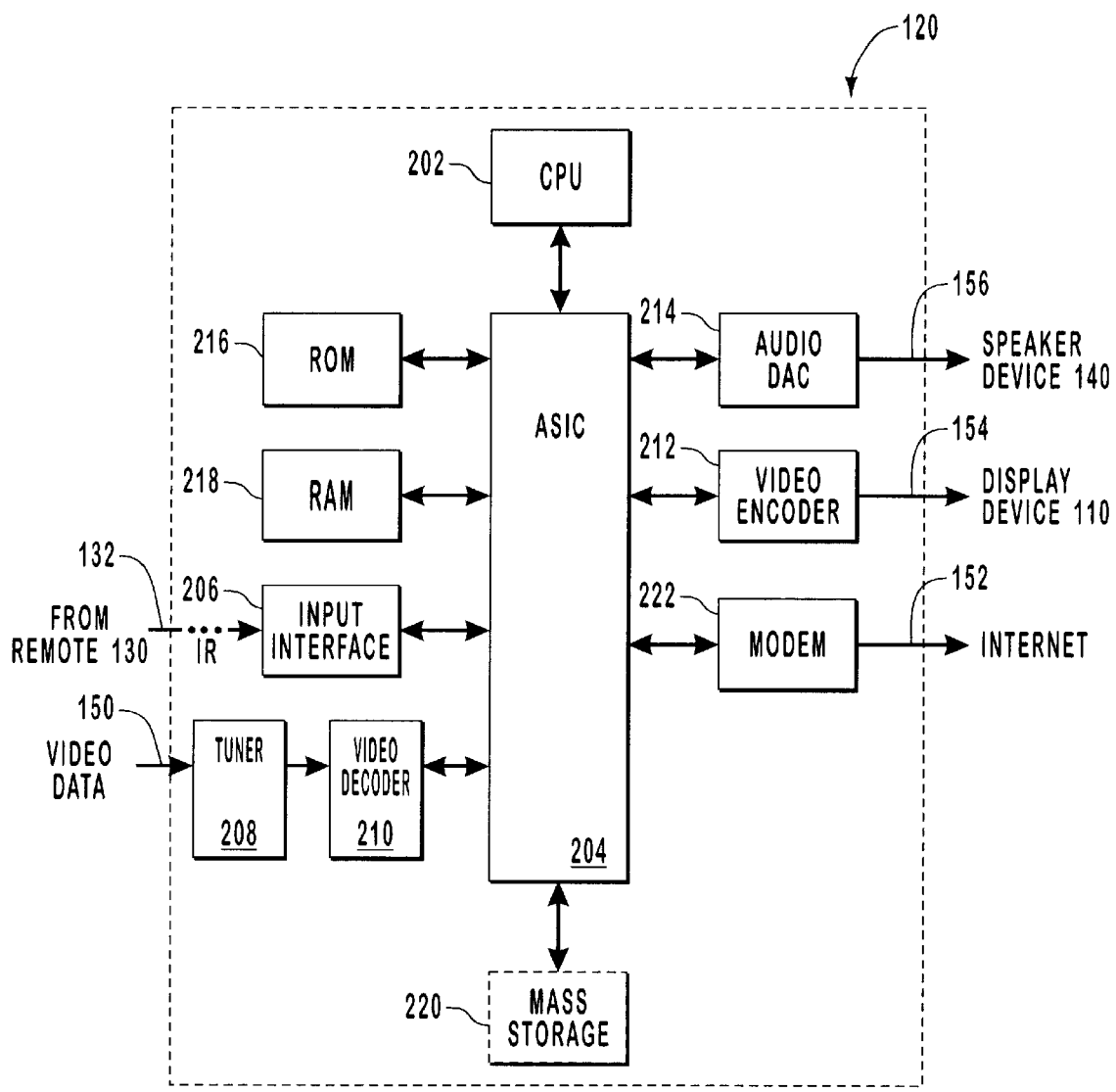
FIG. 2 is a schematic drawing of the management device of FIG. 1.

Now referring to FIG. 2, a block diagram of the internal features of management device 120 is illustrated according to an embodiment of the invention wherein management device 120 is a set-top box. The operation of management device 120 is controlled by Central Processing Unit (CPU) 202, which is coupled to an Application-Specific Integrated Circuit (ASIC) 204. CPU 202 executes software designed to implement features of management device 120 including features of the present invention. ASIC 204 contains circuitry which is used to implement certain functions of management device 120. Instructions, data, and other software necessary for the herein described operation of CPU 202 and ASIC 204 may be stored, for example, in read-only memory (ROM) 216, random-access memory (RAM) 218, and/or mass storage device 220. Mass storage device 220 may be any mass memory means capable of storing large amounts of data such as a magnetic or optical disk drive. It is on mass storage device 220 that the electronic program guide, the viewer events marked with the date and time that the events occurred, and the corresponding electronic program guide information relating to each viewer event can be stored. ROM 216, RAM 218 and mass storage device 220 are communicatively coupled to ASIC 204 so as to be readable by ASIC 204 and so that data may be written from ASIC 204 to RAM 218 and possibly mass storage device 220.

Management device 120 includes a means for providing video image data (e.g., video encoder 212) on video image link 154 to display device 110, and a means for providing video sound data (e.g., audio DAC 214) on video sound link 156 to speaker device 140. If the video data on video input line 150 includes video data of multiple channels, the means for providing and recognizing the video data include a means for tuning to a desired channel of the video data on video input line 150. The means for tuning is represented in FIG. 2 as tuner 208 and may include any device capable of tuning to a desired channel of a video signal.

In one embodiment tuner 208 is controlled by input device 130. Referring back to FIG. 1, input device 130 generates an electronic instruction to tune to a desired channel and transmits that electronic instruction over input link 132 to management device 120. Referring to FIG. 2, the electronic instruction is received by input interface 206 and provided to ASIC 204 that in turn transforms the electronic instruction, if necessary, to be recognizable by tuner 208. Video decoder 210 is used for converting video data from an analog format to a digital format, or from a digital format to an analog format, in the event that ASIC 204 and tuner 208 employ different formats. The electronic instruction is then transmitted to tuner 208. The act of receiving the instruction and tuning to the requested channel using tuner 208 is interpreted by management device 120 as the occurrence of a viewing event that is to be characterized or described with corresponding information from the electronic program guide.

In the embodiment of FIG. 2, home entertainment system 100 is associated with Internet line 152 that enables the home entertainment system to receive the data that constitutes the electronic program guide. In alternative embodiments, the electronic program guide data can be delivered to the home entertainment system using direct-dial communication over standard telephone lines or data transmission over the cable television infrastructure, a satellite network, over-the-air broadcasting or any other available medium.

Management device 120 periodically transmits the viewing behavior information that it has compiled to a central location. Management device 120 can transmit the viewing behavior information via Internet line 152, by direct-dial communication over standard telephone lines, or using any other available communication medium. The hardware and computer-executable instructions included in management device 120 (or any other electronic device in which the invention is implemented) represent one example of means for transmitting the viewing information to a remote location. For example, the means for transmitting the viewing information can be any device that interfaces with the Internet, telephone lines, or another communication medium, such as modem 222, a network interface card, etc.

Figure 3:
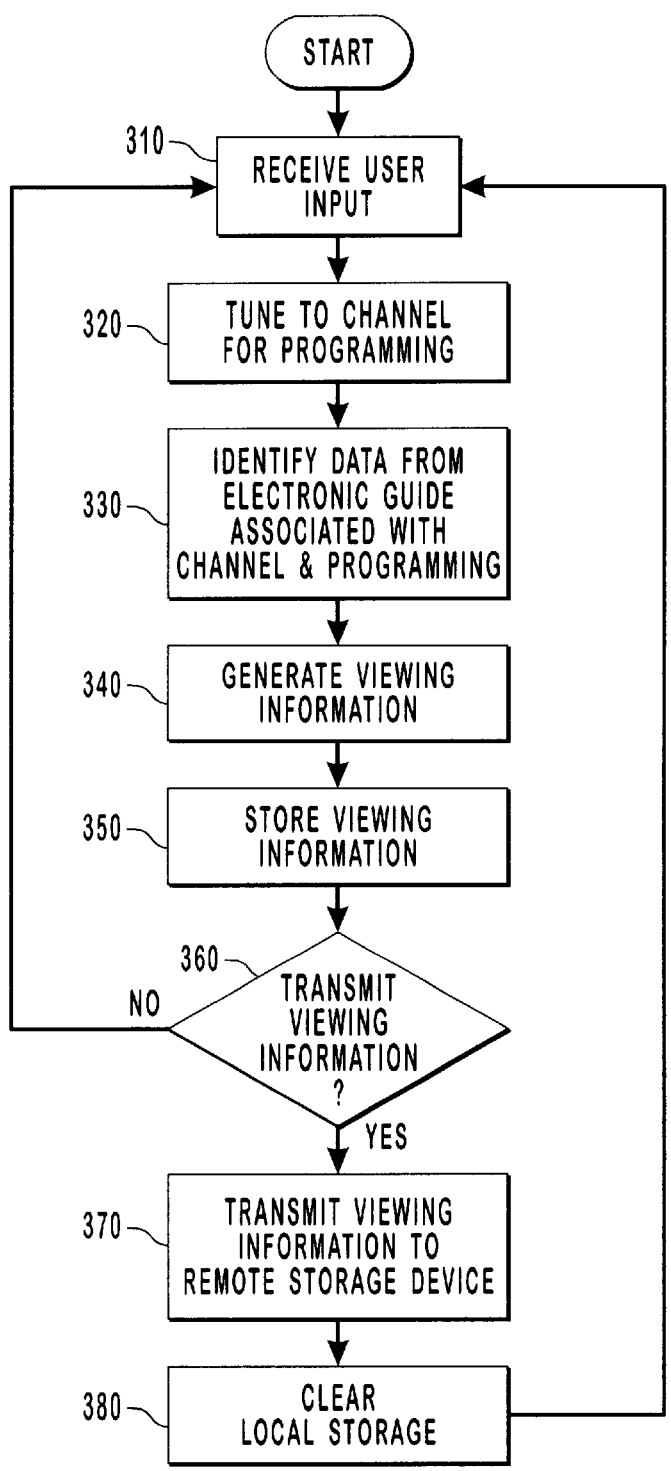
FIG. 3 is a flowchart illustrating a method for obtaining viewing information identifiing programming viewed on a display device.

Referring again to FIG. 2, ASIC 204 operates in conjunction with CPU 202 and uses computer-executable instructions implemented in software and/or hardwired logic circuitry to perform the steps set forth in the flowchart of FIG. 3. These computer-executable instructions may be stored in ROM 216, RAM 218, or mass storage device 220.

Referring now to FIG. 3, a flowchart is provided to illustrate the general steps for obtaining viewing information identifying programming viewed on display device 110 according to one embodiment of the methods of the invention. As explained above, and depicted by step 310, the invention is initiated upon the occurrence of an event. By way of example, the event may request the tuning to a channel, whereby step 320 is followed. Upon tuning to the channel, step 330 identifies the information from the electronic program guide stored in memory that is associated with the programming carried on the tuned channel. Step 340 couples the event with the information identified to generate viewing behavior information. Step 350 stores the viewing behavior information on mass storage 220 of FIG. 2 or any other local storage medium or on a storage medium that is remote with respect to the home entertainment system. After the viewing information is stored, decision block 360 determines whether or not to transmit the viewing behavior information to a central clearinghouse that is remote with respect to the home entertainment system. If it is not time to transmit the viewing information, the process is continued upon the occurrence of a subsequent event. If it is time to transmit the viewing behavior information, then the act of transmitting takes place during step 370, and the local storage is cleared and made ready to store future viewing behavior information by step 380.

Figure 4:
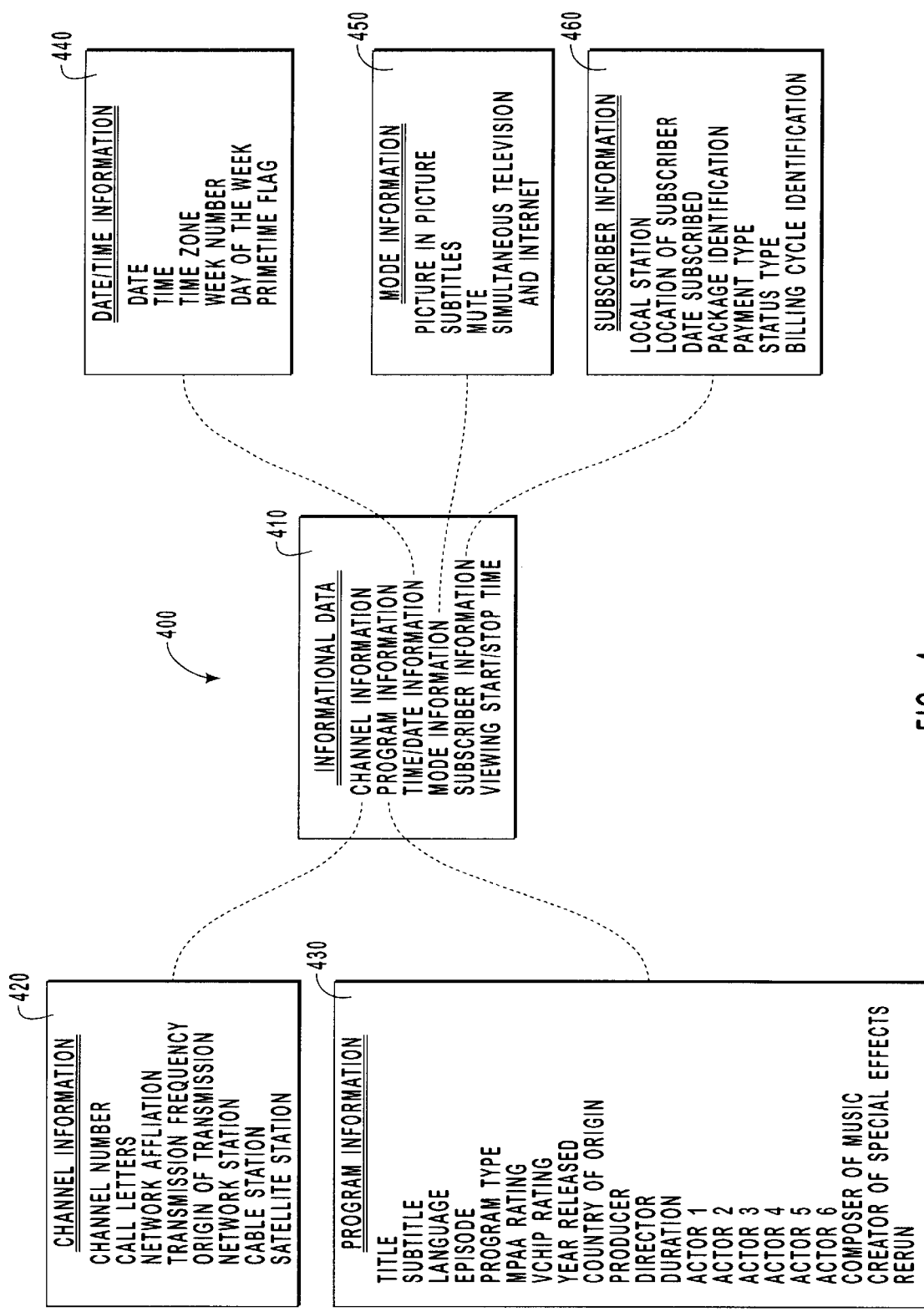
FIG. 4 is a representation of data available through the use of an electronic program guide.

Referring now to FIG. 4, a representation of a menu system of an electronic program guide is provided to demonstrate the abundance of information that is available through the use of an electronic program guide. The information can include anything related to the programming being viewed such as the provider of the programming, the type of programming, the date and time that the programming is being provided, the origination of the programming, and the manner in which the programming is being supplied. While FIG. 4 illustrates the information as being organized in menu system 400, the information can be organized in any desirable format. FIG. 4 is used by way of example to illustrate the type of information that is available and in no way should limit the scope of the invention. FIG. 4 is further used to demonstrate the diversity of information that is identified at home entertainment system 100. Moreover, additional descriptive information, such as information regarding specific programs or channels in the electronic program guide, beyond that which is displayed in FIG. 4 or stored on home entertainment system 100, can be available in databases at the clearinghouse and can be readily linked to the viewing behavior that has been transmitted to the clearinghouse.

Main menu 410 provides an example of sub menus that are available, namely information regarding the channel, program, time/date, mode, subscriber, and viewing start/stop time. Sub menu 420 provides an example of the information that is available regarding the channel, namely, the channel number, the call letters associated with the station, the network affiliation of the station, the cable station, the satellite station, the frequency transmission of the station, and the origination of the transmission. Sub menu 430 provides an example of the information that is available regarding the program, namely, the title of the program, the subtitle, the language used, the episode number and/or name, the program type or classification, the MPAA rating of the program, the VCHIP rating of the program, the year that the program was originally released, the country from which the program originated, the producer, the director, the duration of the program, the various actors in the program, the composer of the music for the program, the creator of the special effects used, and whether this is the first time that the specific program was aired. Sub menu 440 provides an example of the information that would be available regarding the date and time of the program, namely, the date and time that the program is aired, the time zone, the week number and day of the week that the program is aired, and whether or not the program is aired during primetime. Sub menu 450 provides an example of the information that is available regarding the mode employed in viewing the programming, namely, viewing multiple channels simultaneously, using subtitles, employing the mute function, viewing programming while simultaneously using the Internet, or any other interactive modes. Sub menu 460 provides an example of the information that is available regarding the provider of the programming, namely, the station airing the programming, the location of the provider, the date subscribed to the programming service, the programming package subscribed, the payment type used for the service, the status of the account, and the billing cycle identification of the service.

Depending on the types and volume of viewing behavior information that is desired, one or more of the categories of types of information that are illustrated in FIG. 4 (or other information) can be selected for inclusion in viewing behavior information compiled at the home entertainment system. For example, the operator of the central clearinghouse to which the viewing behavior information is to be sent might decide that the desired types of information are the Channel ID, the Subscriber ID, the Program ID and Title, the City and State of the Channel, and the Date and Time. Thus for each viewing event, the foregoing information contained in the appropriate data fields of the electronic program guide and information otherwise maintained at the home entertainment system is identified and stored as an instance of viewing behavior information.

Although the information used to compile viewing behavior information can be conveniently retrieved from an electronic program guide as described above, the information can alternatively be retrieved directly from data transmitted on a television signal. For instance, data is often encoded in the vertical blanking interval of a television signal. In other situations, an entire channel can be dedicated to transmitting data on a television signal. In any of these cases, the encoded data can represent a description of a television program or any other aspect of programming. Thus, the invention extends to compiling viewing behavior information using data encoded in a television signal.

By compiling the viewer behavior information locally, the amount of processing required at the central clearinghouse is significantly reduced when compared to conventional techniques. Furthermore, when last minute changes take place in the program schedule, when different cable companies place networks in different locations in the channel lineup, when programs are aired at different times in different locations, or when viewers receive a signal that is broadcast from a different time zone, inaccuracies do not occur because the processing takes place locally at the home entertainment system.

The invention has been described above primarily in the context of compiling full viewing behavior information at the home entertainment systems, thereby minimizing processing requirements of the central clearinghouse. However, in other embodiments, much of the processing is shifted to the central clearinghouse, so as to reduce the data processing, storage, and transmission requirements of the home entertainment systems. For example, the viewing behavior information that is generated at the home entertainment system can be limited to as little as a unique ID associated with a channel and a unique ID associated with a television program retrieved from the electronic program guide. In this situation, the clearinghouse provides all of the other desired descriptive information from a copy of the electronic program guide to generate and store a comprehensive record of viewing behavior. Thus, data generation and processing can be distributed among the home entertainment systems and the clearinghouse as desired according to the invention.

As explained above, the invention is directed to an automated system and method for tracking viewer behavior of a home entertainment system. The invention can be utilized in a network of home entertainment systems such as for example a system of set-top boxes. As such, the viewer behavior of each home entertainment system is stored locally in each home entertainment system and is periodically transmitted to one or more central clearinghouses that are generally remote with respect to the home entertainment systems. A storage device at the clearinghouse gathers the viewer behavior from the myriad of home entertainment systems and a processor at the clearinghouse further processes the viewing behavior information and/or makes it available to interested entities. The viewing behavior information arrives at the clearinghouse in a format that is usable or close to being usable, because it can include information that identifies and describes programming displayed to the viewer, rather than merely including a channel number.

Figure 5A:
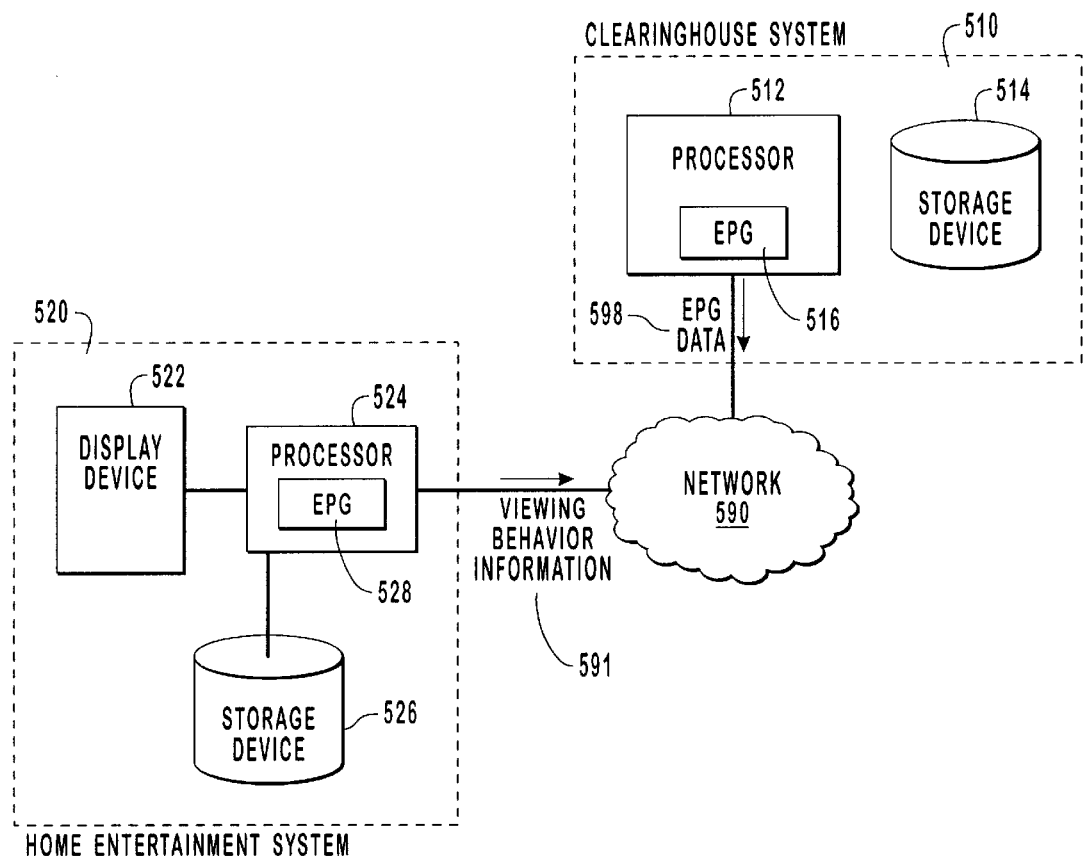
FIG. 5A is a schematic drawing of a home entertainment system connected via network to a clearinghouse system.

FIG. 5A illustrates the interaction between a home entertainment system and a clearinghouse according to one embodiment of the invention. Home entertainment system 520 includes display device 522, processor 524, EPG (electronic program guide) 528, and storage device 526. Clearinghouse system 510 includes processor 512, storage device 514 and, optionally, EPG 516. Home entertainment system 520 and clearinghouse system 510 are connected via network 590.

As explained above, each time a viewing event occurs at the home entertainment system it results in creation of viewing behavior information that includes, for example, the date and time of the event and descriptive information from EPG 528. The viewing behavior is stored locally on storage device 526. Upon the occurrence of a subsequent event, another instance of viewing behavior information is similarly created and stored on storage device 526. Thus, a sequential log is recorded and stored locally on storage device 526 that provides a description of the programming that was viewed on display device 522 and how it was displayed.

Periodically, processor 524 prepares a report of the sequential log for transmission via network 590 as illustrated in FIG. 5A as viewing behavior information 591. Clearinghouse system 510 receives viewing behavior information 591 via network 590 and stores viewing behavior information 591 in storage device 514. Upon transmission of the viewing behavior information or upon confirmation from clearinghouse system 510 that viewing behavior information 591 is stored on storage device 514, processor 524 clears the transmitted viewing behavior information from storage device 526 and awaits the occurrence of a subsequent event.

In order to maintain accurate and current programming information at home entertainment system 520, EPG 528 is periodically updated. The updating of EPG 528 can take place in a number of ways. By way of example, EPG 528 could be updated via direct-dial communication over standard telephone lines, a satellite communication system, or over a network, including the Internet. The updating information can come from a variety of sources such as from clearinghouse system 510 or from a separate source. FIG. 5A illustrates one embodiment whereby EPG 528 may be updated. In the embodiment all current programming information is provided and updated on EPG 516. Clearinghouse system 510 then periodically updates EPG 528 through the following acts: Processor 512 gathers the information required from EPG 516 and transmits it via network 590, as illustrated in FIG. 5A as EPG data 598; and processor 524 receives EPG data 598 via network 590 and updates EPG 528. As such, EPG 528 maintains accurate and current programming information.

Figure 5B:
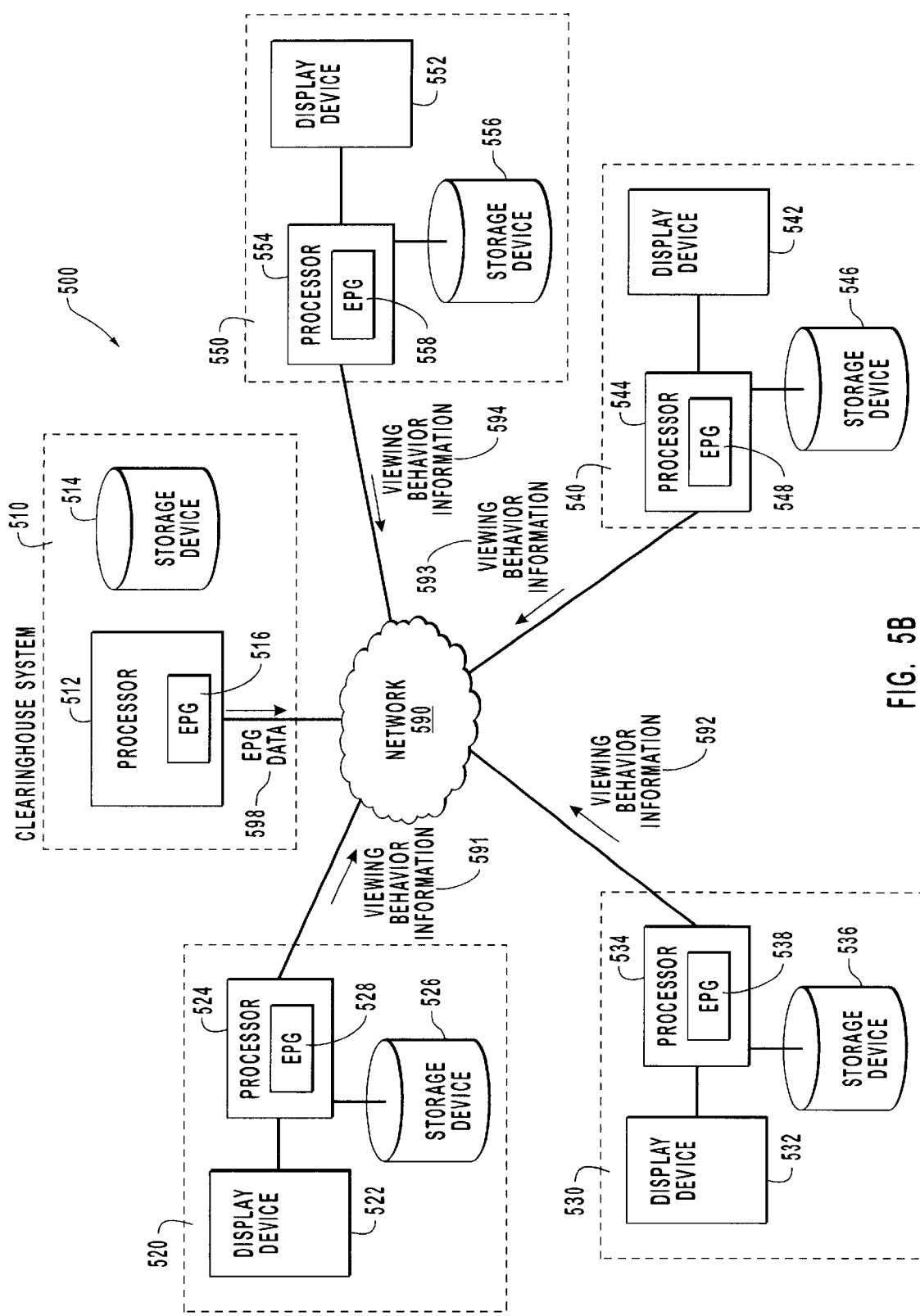
FIG. 5B is a schematic drawing of a plurality of home entertainment systems connected via a network to a clearinghouse system.

As explained above, FIG. 5A illustrates the transmission of data between a home entertainment system and a clearinghouse system via a network. Referring now to FIG. 5B, a network system illustrated generally as 500 demonstrates the transmission of data between a plurality of home entertainment systems and a clearinghouse system via a network. The home entertainment systems are respectively represented as home entertainment systems 520, 530, 540 and 550. The networked system illustrated in FIG. 5B is representative of networks having any number of associated home entertainment systems.

As explained previously, a home entertainment system can include a plurality of consumer electronic devices, but for the purposes of illustration each home entertainment system of FIG. 5B includes a display device (e.g., display devices 522, 532, 542, and 552), a processor, an EPG (e.g., EPGs 528,538,548,558), and a local storage device. Processors 524, 534, 544, and 554 independently gather and transmit the viewing behavior information respectively stored on local storage devices 526, 536, 546, and 556. The viewing behavior information is illustrated as viewing behavior information 591, 592, 593, and 594, and is transmitted to clearinghouse system 510 via network 590 and stored on storage device 514. Upon transmission of the viewing behavior information or upon confirmation from clearinghouse system 510 that the viewing behavior information is stored on storage device 514, processor(s) 524, 534, 544, and 554 independently clear the transmitted viewing behavior information from storage device 526 and await the occurrence of subsequent events.

While the present invention is described in the context of compiling viewing behavior information that relates to television programming displayed at a home entertainment system, the invention can also be used to monitor and record user behavior with respect to any other type of information or programming that might be displayed at the home entertainment system. For instance, embodiments of the invention can be used to compile information relating to advertisements that have been displayed at the home entertainment system and viewer response to the advertisements. In addition, embodiments of the invention can be used to compile Internet usage statistics and behavior information. Examples and further details of such other kinds of information that can be compiled according to embodiments of the invention are disclosed in U.S. patent application Ser. No. 09/76,631, which is entitled "Tracking Viewing Behavior of Advertisements on a Home Entertainment System", filed on the same day as this patent Application, and is incorporated herein by reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a home entertainment system comprising a television screen, a data storage medium, and a tuner, a method of compiling viewer behavior information at the home entertainment system in order to conserve processing resources at a central clearinghouse that tracks viewer behavior information for a plurality of home entertainment systems, the method comprising the acts of:

detecting at the home entertainment system, an event which serves as an instructional input relative to programming being displayed at the home entertainment system;

in response to the detected event, retrieving from the electronic program guide program related information that is specifically associated with the programming being displayed during the event, and such that the central clearinghouse need not retrieve and process similar information when desired viewing behavior information is later transmitted to the central clearinghouse, thereby conserving processing resources at the central clearinghouse;

storing at the home entertainment system, data which corresponds to the desired viewing behavior information, including at least the event coupled with the program related information corresponding to the event that was retrieved from the electronic program guide; and transmitting the stored data from the home entertainment system to the central clearinghouse, including the event coupled with the program related information corresponding to the event.

2. A method as recited in claim 1, wherein the stored data includes information specific to a channel used to view the programming being displayed at the home entertainment system.

3. A method as recited in claim 1, wherein the stored data includes information describing the programming carried by a channel used to view the programming being displayed at the home entertainment system.

4. A method as recited in claim 1, wherein the stored data includes a date and time of the programming being displayed at the home entertainment system.

5. A method as recited in claim 1, wherein the stored data includes an identifier associated with the home entertainment system.

6. A method as recited in claim 1, wherein the stored data includes information associated with a mode of the home entertainment system used to view the programming being displayed at the home entertainment system.

7. A method as recited in claim 1, wherein the stored data includes information associated with a supplier of a channel used to view the programming being displayed at the home entertainment system.

8. A method as recited in claim 1, wherein the event is in response to the act of tuning to a channel.

9. A method as recited in claim 1, wherein the programming being displayed at the home entertainment system comprises first programming and subsequent second programming, and wherein the event comprises the end of the first programming and the beginning of the second programming.

10. A computer program product for use in a home entertainment system that comprises a television screen, a tuner, a data storage medium, and a processor, the computer program product implementing a method of compiling viewer behavior information at the home entertainment system in order to conserve processing resources at a central clearinghouse that tracks viewer behavior information for a plurality of home entertainment systems, the computer program product comprising:
 a computer-readable medium having computer-executable instructions stored thereon that, when executed at the home entertainment system, cause the home entertainment system to perform the method, including:
  detecting at the home entertainment system, an event which serves as an instructional input relative to programming being displayed at the home entertainment system;
  in response to the detected event, retrieving from the electronic program guide program related information that is specifically associated with the programming being displayed during the event, and such that the central clearinghouse need not retrieve and process similar information when desired viewing behavior information is later transmitted to the central clearinghouse, thereby conserving processing resources at the central clearinghouse;
  storing at the home entertainment system, data which corresponds to the desired viewing behavior information, including at least the event coupled with the program related information corresponding to the event that was retrieved from the electronic program guide; and
  transmitting the stored data to the central clearinghouse, including the event coupled with the program related information corresponding to the event.

11. A computer readable medium as recited in claim 10, wherein the event comprises tuning to a channel in response to user input.

12. A computer readable medium as recited in claim 10, wherein the stored data includes information specific to a channel used to view the programming being displayed at the home entertainment system.

13. A computer readable medium as recited in claim 10, wherein the stored data includes information describing the programming being displayed at the home entertainment system.

14. A computer readable medium as recited in claim 10, wherein the computer-executable instructions, when executed further include in the stored data a date and time of the programming the programming being displayed at the home entertainment system.

15. In a computer system having a data storage device, the computer system being communicatively connected via a communications network with a plurality of home entertainment systems, a method for compiling viewer behavior data identifying programming viewed on the plurality of home entertainment systems that conserves computing resources at the computer system, the method comprising:
 performing for each of the plurality of home entertainment systems, the acts of:
  establishing communication with a particular one of the plurality of home entertainment systems;
  configuring the particular home entertainment system to compile desired viewing behavior data to be transmitted to the computer system, wherein at least a portion of the desired viewing behavior information is to be retrieved from an electronic program guide stored at the particular home entertainment system so that the computer system need not retrieve and process similar information when the desired viewing behavior information is later received from the particular home entertainment system; and
  receiving from the particular home entertainment system viewer behavior data for programming that was displayed on the television screen associated with the particular home entertainment system, the viewer behavior data having been generated at the particular home entertainment system based on at least:
   a specific event which serves as an instructional input relative to programming displayed at the particular home entertainment system;
   a channel tuned by a tuner at the particular home entertainment system; and
   based on the configuration of the particular home entertainment system, data retrieved from the electronic program guide at the particular home entertainment system,
  such that the received viewer behavior data includes at least the specific event coupled with the data retrieved from the electronic program guide and that corresponds to the programming that was being displayed at the home entertainment system during the specific event.

16. A method as recited in claim 15, wherein the viewer behavior data received at the computer system includes information that identifies the programming viewed on the particular home entertainment system.

17. A method as recited in claim 15, wherein the viewer behavior data received at the computer system includes an identifier associated with the particular one of the plurality home entertainment systems.

18. A method as recited in claim 15, wherein the viewer behavior data received at the computer system includes a date and time of the programming displayed on the television screen associated with the particular home entertainment system.

19. A method as recited in claim 15, wherein the act of establishing communication comprises the use of the Internet.

20. A method as recited in claim 15, wherein the act of establishing communication comprises direct dial communication over a telephone line.

21. For a computer system having a data storage device, the computer system being communicatively connected via a communications network with a plurality of home entertainment systems, a computer program product comprising one or more computer readable media carrying computer executable instructions that implement a method for compiling viewer behavior data identifying, programming viewed on the plurality of home entertainment systems that conserves computing resources at the computer system, the method comprising:

performing for each of the plurality of home entertainment systems, the acts of:

establishing communication with a particular one of the plurality of home entertainment systems;

configuring the particular home entertainment system to compile desired viewing behavior data to be transmitted to the computer system, wherein at least a portion of the desired viewing behavior information is to be retrieved from an electronic program guide stored at the particular home entertainment system so that the computer system need not retrieve and process similar information when the desired viewing behavior information is later received from the particular home entertainment system; and receiving from the particular home entertainment system viewer behavior data for programming that was displayed on the television screen associated with the particular home entertainment system, the viewer behavior data having been generated, at the particular home entertainment system based on at least:

an a specific event which serves as an instructional input relative to programming displayed at the particular home entertainment system;

a channel tuned by a tuner at the particular home entertainment system; and based on the configuration of the particular home entertainment system, data retrieved from the electronic program guide at the particular home entertainment system, such that the received viewer behavior data includes at least the specific event coupled with the data retrieved from the electronic program guide and that corresponds to the programming that was being displayed at the home entertainment system during the specific event.

22. A computer program product as recited in claim 21, wherein the viewer behavior data received at the computer system includes information that identifies the programming viewed on the particular home entertainment system.

23. A computer Program product as recited in claim 21, wherein the viewer behavior data received at the computer system includes an identifier associated with the particular one of the plurality home entertainment systems.

24. A computer program product as recited in claim 21, wherein the viewer behavior data received at the computer system includes a date and time of the programming displayed on the television screen associated with the particular home entertainment system.

25. A computer program product as recited in claim 21, wherein the act of establishing communication comprises the use of the Internet.

26. A computer program product as recited in claim 21, wherein the act of establishing communication comprises direct dial communication over a telephone line.

* * * * *